(12) United States Patent
Tan et al.

(10) Patent No.: US 11,935,529 B2
(45) Date of Patent: Mar. 19, 2024

(54) SYSTEM AND METHOD FOR VIRTUAL ASSISTANT EXECUTION OF AMBIGUOUS COMMAND

(71) Applicant: MOTOROLA SOLUTIONS, INC., Chicago, IL (US)

(72) Inventors: Ying Bin Tan, Simpang Ampat (MY); Chew How Lim, Sungai Petani (MY); Yih Farn Ghee, Alor Setar (MY); Joe Yie Chong, Ipoh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 256 days.

(21) Appl. No.: 17/304,114

(22) Filed: Jun. 15, 2021

(65) Prior Publication Data

US 2022/0399014 A1     Dec. 15, 2022

(51) Int. Cl.
*G10L 15/22*     (2006.01)

(52) U.S. Cl.
CPC ........ *G10L 15/22* (2013.01); *G10L 2015/223* (2013.01)

(58) Field of Classification Search
CPC .......................... G10L 15/22; G10L 2015/223
See application file for complete search history.

(56) References Cited

U.S. PATENT DOCUMENTS

| | | | |
|---|---|---|---|
| 6,604,075 B1 * | 8/2003 | Brown | H04M 3/4938 704/E15.044 |
| 7,668,710 B2 | 2/2010 | Doyle | |
| 7,729,920 B2 | 6/2010 | Chaar et al. | |
| 8,694,322 B2 * | 4/2014 | Snitkovskiy | G06F 3/167 704/E17.011 |
| 8,954,326 B2 | 2/2015 | Kwak et al. | |
| 10,083,688 B2 | 9/2018 | Piernot et al. | |
| 10,515,632 B2 * | 12/2019 | Gilbert | G10L 15/22 |
| 10,978,074 B1 * | 4/2021 | Roy | G10L 15/16 |
| 2004/0122674 A1 * | 6/2004 | Bangalore | G10L 15/26 704/E15.045 |
| 2008/0215516 A1 | 9/2008 | Chaar et al. | |
| 2013/0325482 A1 * | 12/2013 | Tzirkel-Hancock | G10L 15/22 704/275 |
| 2015/0340033 A1 * | 11/2015 | Di Fabbrizio | G10L 15/18 704/254 |

(Continued)

FOREIGN PATENT DOCUMENTS

JP     2010199777 A     9/2010

OTHER PUBLICATIONS

Sun, Chengzheng. "Undo as concurrent inverse in group editors." ACM Transactions on Computer-Human Interaction (TOCHI) 9.4 (2002): 309-361. (Year: 2002).*

*Primary Examiner* — Brian L Albertalli

(57) ABSTRACT

Techniques for virtual assistant execution of ambiguous commands is provided. A voice instruction from a user may be received at a virtual assistant. The voice instruction may request the virtual assistant to perform a command. The command that is most likely being requested by the voice instruction from the user is identified. An ordered set of actions to execute when performing the command may be retrieved. Each action of the ordered set of actions may indicate if the action is reversible. Each action of the ordered set of actions may be executed in order until a not reversible action is reached or no further actions are in the ordered set of actions.

20 Claims, 4 Drawing Sheets

(56) References Cited

U.S. PATENT DOCUMENTS

2016/0132291 A1* 5/2016 Bai .................. G10L 15/22
  715/728
2018/0267845 A1* 9/2018 Bilek ................ G06F 9/5005
2020/0218995 A1  7/2020 Neogi et al.
2020/0380974 A1* 12/2020 Gallagher .......... H04R 3/005

* cited by examiner

SYSTEM AND METHOD FOR VIRTUAL ASSISTANT EXECUTION OF AMBIGUOUS COMMAND

BACKGROUND

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
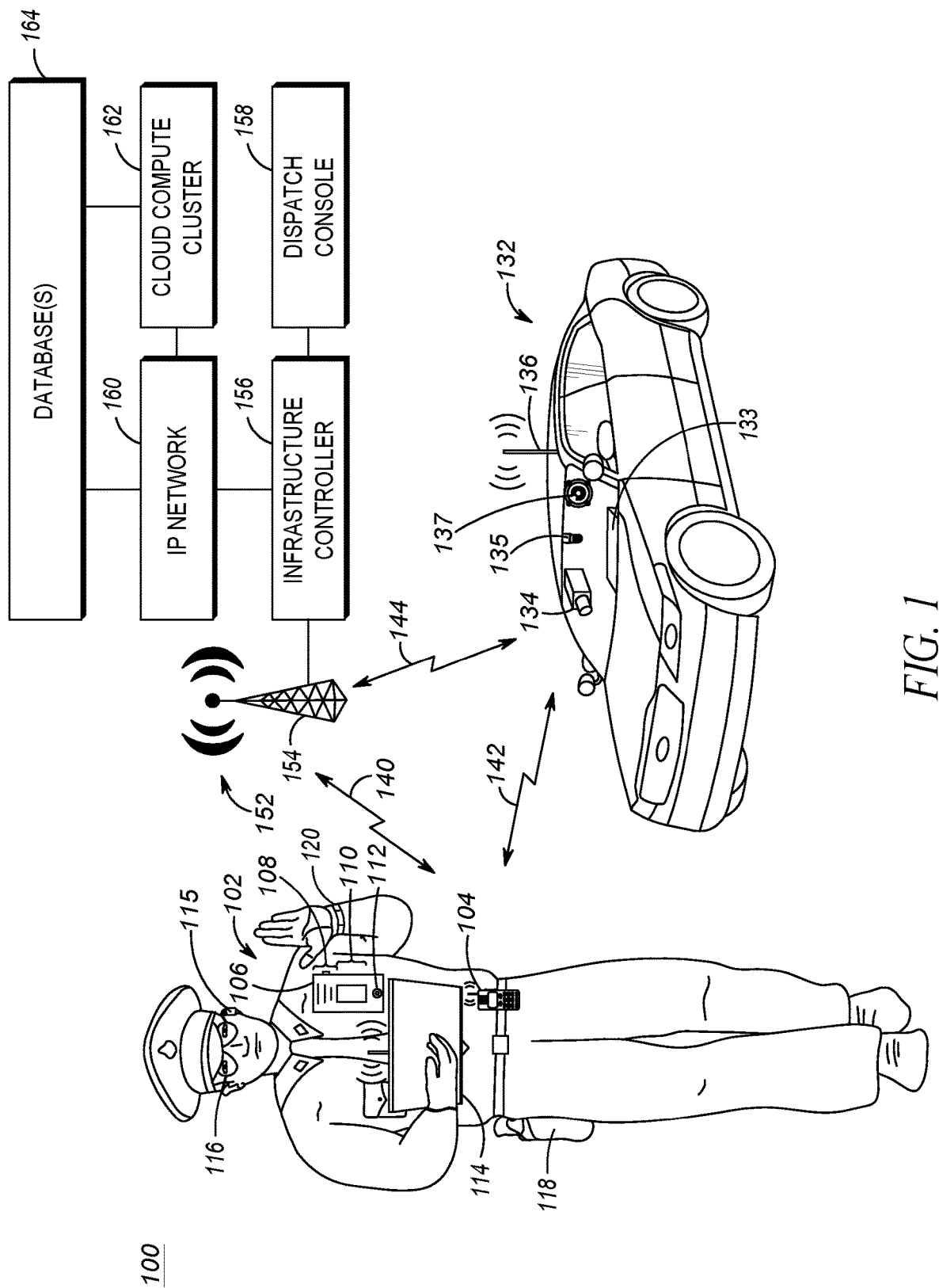
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In a public safety environment, the ability to issue a verbal command to a virtual assistant, which can also be referred to as a digital assistant or electronic digital assistant, to execute an action/set of actions is very useful. A first responder, such as a police officer, needs to be aware of his surroundings and not pre-occupied with other tasks. This is often referred to as "eyes up, hands free" meaning that the officer is visually aware of his surroundings (e.g. not looking at a computer screen, etc.) and has his hands free (e.g. not pressing buttons, etc.). An officer may issue a verbal command to a virtual assistant. The virtual assistant may retrieve a standard operating procedure (SOP) corresponding to the command. The SOP for the command may include an ordered set of actions that are to be taken to execute the command. The virtual assistant may cause those actions to be executed, in order, thus freeing the officer from having to execute those actions.

A problem can arise when the virtual assistant is not able to determine the specific verbal command with a sufficient confidence level. In a civilian environment, the virtual assistant may interact with the user to get clarification (e.g. "Did you mean . . . " or "I did not understand what you said. Please try again" etc.). In a public safety environment, this additional interaction is problematic, as it may impair the ability of the officer to maintain situational awareness.

The techniques described herein solve these problems and others individually and collectively. When a virtual assistant receives a command that it cannot identify with a sufficiently high level of confidence, it selects the command that is most likely being requested by the user. The virtual assistant retrieves a SOP associated with the selected command. The SOP includes an ordered set of actions to be executed to carry out the command.

Each action of the ordered set of actions includes an indication if the action is reversible or not. As will be described in further detail below, a reversible action is one that can be undone with little or no adverse impact. The virtual assistant may begin to execute the actions, one after another, in order, as long as the action is indicated as reversible. Upon reaching an action that is not reversible, the virtual assistant may request confirmation from the user that they wish to execute the irreversible action. Upon receipt of confirmation, the virtual assistant continues executing the actions in the ordered list, until the next irreversible action is reached, at which point the requesting confirmation process repeats. This continues until there are no more actions in the ordered set of actions.

If the user does not provide confirmation that an irreversible action should be executed, the virtual assistant may discontinue performing the actions in the ordered list of actions. In some cases, the virtual assistant may reverse all actions that have been executed that were identified as reversible.

A method is provided. The method may include receiving, at a virtual assistant, a voice instruction from a user, the voice instruction requesting the virtual assistant to perform a command. The method may further include identifying the command that is most likely being requested by the voice instruction from the user. The method may further include retrieving an ordered set of actions to execute when performing the command, each action of the ordered set of actions indicating if the action is reversible or not reversible. The method may further include executing each action of the ordered set of actions, in order, until a not reversible action is reached or no further actions are in the ordered set of actions.

In one aspect, the method further includes requesting confirmation from the user to execute the not reversible action and executing the not reversible action when confirmation is received from the user. In one aspect, the method further includes repeating the steps of executing each action of the ordered set of actions, requesting confirmation, and executing the not reversible action while unexecuted actions remain in the ordered set of actions.

In one aspect, the method further includes determining the user is under a high cognitive load. In one aspect, the action is reversible if it can be undone without adverse effects. In one aspect, the action is not reversible if it cannot be undone. In one aspect, the action is not reversible if it cannot be undone without adverse effects.

A system is provided. The system includes a processor and a memory coupled to the processor. The memory contains thereon a set of instructions that when executed by the processor cause the processor to receive, at a virtual assistant, a voice instruction from a user, the voice instruction requesting the virtual assistant to perform a command. The instructions further cause the processor to identify the command that is most likely being requested by the voice instruction from the user. The instructions further cause the processor to retrieve an ordered set of actions to execute when performing the command, each action of the ordered set of actions indicating if the action is reversible or not reversible. The instructions further cause the processor to execute each action of the ordered set of actions, in order, until a not reversible action is reached or no further actions are in the ordered set of actions.

In one aspect, the instructions further cause the processor to request confirmation from the user to execute the not reversible action and execute the not reversible action when confirmation is received from the user. In one aspect, the instructions further cause the processor to repeat the steps of execute each action of the ordered set of actions, request confirmation, and execute the not reversible action while unexecuted actions remain in the ordered set of actions.

In one aspect, the instructions further cause the processor to determine the user is under a high cognitive load. In one aspect, the action is reversible if it can be undone without adverse effects. In one aspect, the action is not reversible if it cannot be undone. In one aspect, the action is not reversible if it cannot be undone without adverse effects.

A non-transitory processor readable medium is provided. The medium contains thereon a set of instructions that when executed by the processor cause the processor to receive, at a virtual assistant, a voice instruction from a user, the voice instruction requesting the virtual assistant to perform a command. The instructions on the medium further cause the processor to identify the command that is most likely being requested by the voice instruction from the user. The instructions on the medium further cause the processor to retrieve an ordered set of actions to execute when performing the command, each action of the ordered set of actions indicating if the action is reversible or not reversible. The instructions on the medium further cause the processor to execute each action of the ordered set of actions, in order, until a not reversible action is reached or no further actions are in the ordered set of actions.

In one aspect, the medium further comprises instructions to request confirmation from the user to execute the not reversible action and execute the not reversible action when confirmation is received from the user. In one aspect, the medium further comprises instructions to repeat the steps of execute each action of the ordered set of actions, request confirmation, and execute the not reversible action while unexecuted actions remain in the ordered set of actions.

In one aspect, the medium further comprises instructions to determine the user is under a high cognitive load. In one aspect, the action is reversible if it can be undone without adverse effects. In one aspect, the action is not reversible if it cannot be undone without adverse effects.

Further advantages and features consistent with this disclosure will be set forth in the following detailed description, with reference to the figures.

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices (wherein the single user 102 and the additional users may form a talkgroup of related users).

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone 135, single coupled vehicular transceiver 136, and single speaker 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (i.e., short-range in comparison to the long-range transmitter such as a LMR or broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (i.e., talkgroup members not shown in FIG. 1) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user, perhaps including a suspect and the suspect's surroundings, storing the captured image and/or audio data for further analysis or transmitting the captured audio and/or video data as an audio and/or vide stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, remote microphone functionality for voice communications in cooperation with portable radio 104, and remote speaker.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

An in-ear or over-the ear earpiece or headphone 115 may be present for providing audio to the user in a private fashion that is not accessible to other users nearby the user 102. The earpiece or headphone 115 may be wiredly or wirelessly communicatively coupled to one or both of the RSM 106 and the portable radio 104, which may be configured to provide audio received from the RAN 152 and/or from other users to the user 102 based on a manual configuration of the RSM 106 or the portable radio 104, or based on some automatic routing mechanism at the one of the RSM 106 and the portable radio 104 that may route all audio to the earpiece or headphone 115 whenever it is detected as connected to the one of the RSM 106 and the portable radio 104, or may selectively route audio received at the one of the RSM 106 and the portable radio 104 to the earpiece or headphone 115 based on various contextual parameters, such as a content of the received audio, an identity of who sent the received audio, a covert status of the user 102, an incident status of the user 102, a determination of nearby users associated with the user 102, or some other contextual parameter.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In other embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In still other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other electronic device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone 135, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. The omni-directional or unidirectional microphone 135, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the single speaker 137 as being placed inside of the vehicle 132 and coupled to the vehicular computing device 133, in other embodiments, multiple speakers may be provided inside and/or outside of the vehicle 132 (all addressed simultaneously or individually addressable for outputting separate audio streams), or the single speaker 137 may be placed outside of the vehicle and function as a PA speaker, among other possibilities.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras and sensors) within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 4, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at infrastructure controller 156. Databases 164 may further include the SOPs associated with the various commands that may be executed by the virtual assistant. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 disclosed herein and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police car or cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. In the examples of a user 102 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

In operation, a user, such as officer 102 may issue a voice command to a virtual assistant implemented in the cloud compute cluster 162. If the virtual assistant is able to understand the command with sufficiently high confidence, the virtual assistant may retrieve a SOP for the command from the database 164. The SOP will include a set of ordered actions that are to be executed when carrying out the command. Some examples of SOPs and their associated sets of ordered actions are described in further detail with respect to FIG. 2. Because the command was understood with sufficient confidence, the virtual assistant may simply execute the actions, in order, without further interaction with the officer.

If the command is not understood with sufficient confidence, in some implementations the virtual assistant may determine if the officer is under a high cognitive load. For example, the officer may be in a stressful situation as reflected by measurements from biometric sensor wristband 120, may be in a foot chase/vehicle chase as evidenced by accelerometer or location measurements of the officer 102 and/or his vehicle 132, or any number of other factors. What should be understood is that the level of cognitive load on the officer may be determined.

If the officer does not appear to be under a high cognitive load, the virtual assistant may use resolution mechanisms that are common among civilian devices. For example, the virtual assistant may simply state that it did not understand the command and request that the command be repeated. In other cases, the virtual assistant may identify what the most likely command was, and ask the user if that is the command they were attempting to execute. In situations where the user is not under high cognitive load, obtaining clarification through such methods is acceptable, as the officer is not currently engaged in a situation where he is involved with other things and where delay in command execution could compromise the safety of the officer and others.

It should be understood that the techniques described herein are not dependent on determining the cognitive load of the officer. In some implementations, when a command is not understood, the virtual assistant may proceed with the process described below, regardless of the officer's cognitive load level.

If the command was not clearly understood, the virtual assistant may determine the most likely command that was being requested. For example, there may be a command "evacuate building" that will cause the virtual assistant to take the actions necessary to evacuate the building, in an order prescribed by a SOP. The virtual assistant's language processing function may have a threshold that states if a command cannot be determined with 90% or greater confidence level, the command is ambiguous. If the virtual assistant is able to determine with a confidence level of 80% that the command was to "evacuate building" the virtual assistant may determine that this was the most likely requested command.

The virtual assistant may also take into account other environmental and situational parameters to determine the most likely command being requested. For example, if the officer is, based on location data, standing in the middle of a hay field, it is not likely he would be issuing an evacuate building command. Similarly, if the sensor data indicates the officer is moving at a higher than normal rate of speed (e.g. some type of chase), an "evacuate building" command is unlikely.

In some cases, the virtual assistant may have a finite number of commands which it can execute. When receiving a voice command, the virtual assistant may determine a confidence level that the received command matches each of the finite number of possible commands. If no command has a confidence level that exceeds the non-ambiguous threshold, then the command with the highest confidence level may be selected as the command that is most likely being requested.

In some implementations, the various techniques may be combined. For example, the most likely command determined by the highest confidence level may be analyzed in light of the officer's current environmental and situational parameters. If there is a conflict (e.g. the most likely command does not correspond to the environmental and situation parameters, etc.) an alternate most likely command may be selected. For example, the command with the second highest confidence level.

What should be understood is that the techniques described herein are not dependent on any particular mechanism for determining the command that is most likely being requested, and any mechanism currently available or developed in the future would be usable by the techniques described herein.

Once the command that is most likely being requested by the user is determined, the database 164 may be accessed to retrieve a SOP associated with the command. The SOP may specify an ordered list of actions that are to be executed by the virtual assistant when executing the command. Each action included in the ordered list of actions may include an indication if the action is reversible. Further descriptions of commands, ordered lists of actions, and reversible actions are presented with respect to FIG. 2.

The virtual assistant may then start at the beginning of the ordered list of actions. If the action is reversible, the virtual assistant may execute the action without further input. The reason for this, as is described in further detail below, is that there is no adverse impact to executing a reversible action. If it turns out that the virtual assistant was incorrect in the determination of the most likely command, the reversible action can simply be undone, without any adverse impact. The virtual assistant can continue going through the list of actions until either there are no more actions in the list (in which case the command is complete) or the next action to be executed is a not reversible action. It should be not reversible and irreversible are used interchangeably throughout this description.

If the next action to be executed is an irreversible action, the virtual assistant may then request confirmation from the command issuer that the irreversible action should be executed. Although requesting confirmation from the user may increase the user's cognitive load, which may have already been elevated, the confirmation verifies that the virtual assistant has selected the correct most likely command. If the user confirms that the action should be executed, the virtual assistant may execute the action and continue down the list, repeating the procedure described above.

If the user does not confirm that the irreversible action should be executed, the virtual assistant may stop executing the actions in the ordered list of actions. In some implementations, lack of confirmation may indicate that the virtual assistant incorrectly identified the command most likely being requested. The virtual assistant may then reverse all actions that had previously been executed (e.g. the executed actions were not associated with the actual command being requested, etc.).

It should be understood that the virtual assistant audibly requesting confirmation of execution of an irreversible action and receiving a voice response is only one possible implementation. Other implementations may include, but are not limited to display screen input and output (including touch screen), pressing a button on a communications device such as device 104, visual gestures, device movement, eye gaze detection, of any other suitable means of requesting and receiving user input.

Figure 2:
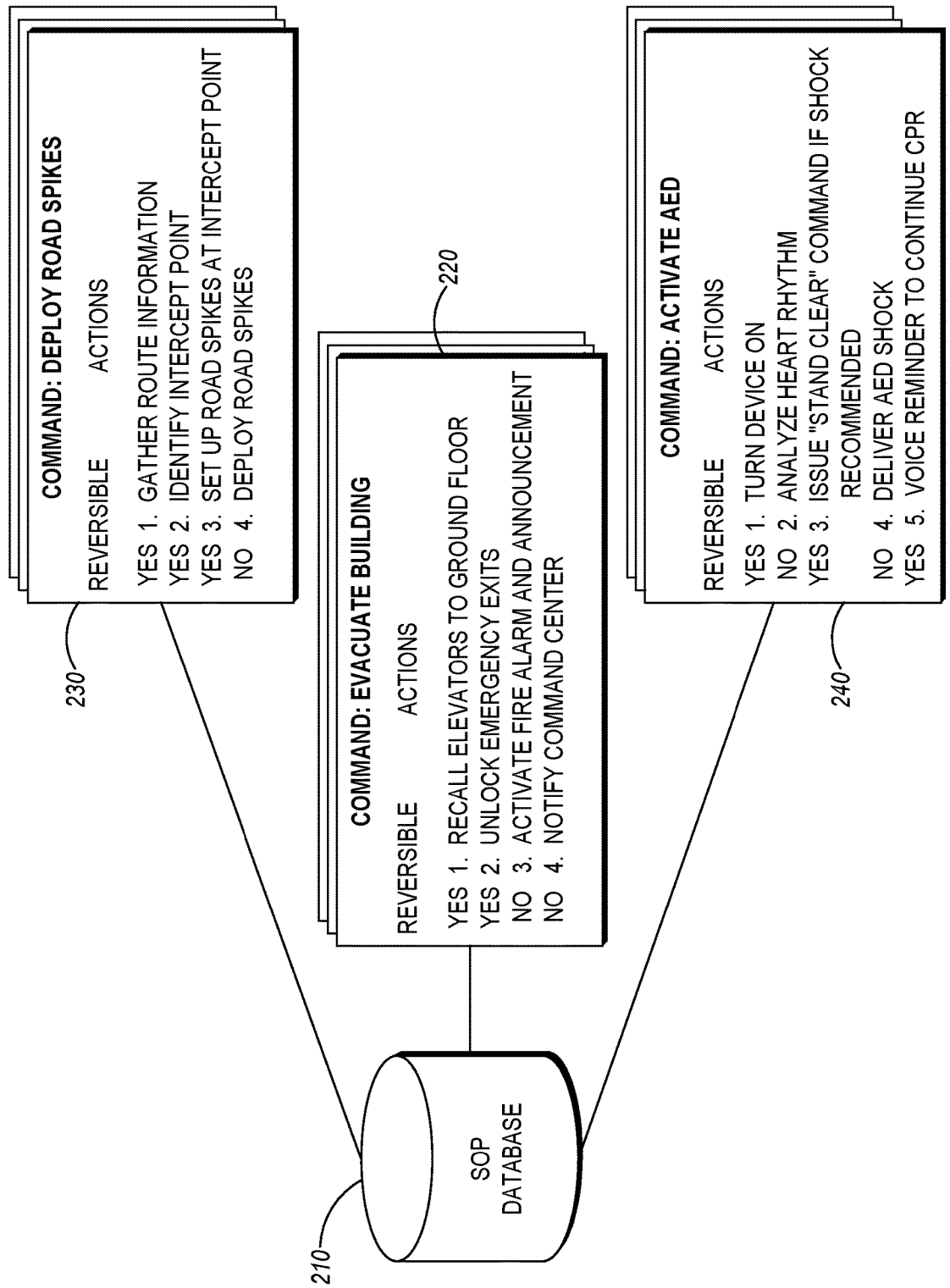
FIG. 2 depicts examples of possible standard operating procedures, in accordance with the techniques described herein.

FIG. 2 depicts examples of possible standard operating procedures, in accordance with the techniques described herein. FIG. 2 includes a SOP database 210 that may include the procedures to be followed for any command issued to a virtual assistant. The SOP database may, for example, be included in the database 164 described with respect to FIG. 1.

For every command that the virtual assistant is able to execute, an ordered set of actions to be taken to carry out the command is provided. Each of these actions includes an indication if the action is reversible. A reversible action is one in which the action can be undone with no or minimal adverse effects. For example, the action of unlocking a door can be reversed by simply relocking the door. Although there is the possibility that someone may open the door while it is unlocked, in general, there would be no long term impact.

In contrast, a not reversible action is one in which the action cannot be undone or cannot be undone without adverse effects. For example, instructing an automatic defibrillator device to administer an electrical shock to a patient is an action that cannot be undone. Once the patient has been shocked, it is impossible to "un-shock" the patient. There are some actions that are considered not reversible even if the action can be physically undone, but not without adverse effects. For example, causing the fire alarm in a building to activate can be physically reversed by causing the fire alarm to deactivate. However, the fact that the alarm sounded in the first place may have caused stress and/or anxiety to anyone who heard the alarm. Simply turning off the alarms does not cause those effects to disappear. A not reversible action which yields adverse effects includes, but is not limited to, physical damage or loss of life, psychological panic in mass public, cybersecurity authorized access, potential unlock of any security door that can expose to higher risk, etc. In general, a reversible action is one that can be undone with substantially no consequences whereas a not reversible action is one that either cannot be undone or cannot be undone without adverse effects.

FIG. 2 depicts several example SOPs and their associated actions, including whether those actions are reversible or not. For example, the command to a virtual assistant to evacuate a building may be associated with an evacuate building SOP 220. The SOP to evacuate a building includes a set of ordered instructions. In this example, the first action is to recall all elevators to the ground floor. This action is listed as reversible, because it can be undone by simply releasing the elevators to resume their normal tasks. As such, there is no adverse effect to execution of this action and it is reversible.

The next action may be to unlock emergency exits. Just as above, this action is easily reversible by simply relocking the emergency exits. Although it is possible that someone may improperly enter via an emergency exit, the potential of such an occurrence, in general, is minimal. However, it should be understood that SOP 220 is simply an example. In some cases and/or locations (e.g. military base, hazardous materials storage site, etc.) the risk posed by improperly unlocking a door may not be insignificant. In such cases, the step may be indicated as not reversible.

The next action in SOP 220 is to activate the fire alarm and announcement. As mentioned above, such an action is not reversible because it may cause panic to set in amongst those who heard the alarm and announcement to evacuate the building. Simply turning off the alarm and announcement cannot reverse the panic that may have been caused. In other words, the action cannot be undone without adverse effects. The last step may be to notify the command center. In this particular example, notifying the command center may cause additional procedures to take place (e.g. create an incident record, dispatch first responders, etc.). That action cannot be reversed, as once the command center has created an incident, the incident cannot be deleted. It may be deactivated, but the incident record itself will still exist.

SOP 230 depicts a similar set of ordered actions for a command to deploy road spikes. The first action may be to gather route information of a suspect that is attempting to avoid apprehension. As this is merely gathering data, the action can be reversed by simply discarding the data. The next action may be to identify an intercept point where the suspect may be apprehended by deploying the road spikes. As no physical action has occurred, this action would be reversible by simply discarding the identified intercept point.

The next action may be to set up (or instruct an officer located at the intercept point to set up) the road spikes at the intercept point. Setting up the road spikes may include preparing to deploy the road spikes onto the roadway. This action is reversible, because even though physical steps have been taken to prepare to deploy the road spikes, these can be reversed by simply not deploying the road spikes. The final action may be to deploy the road spikes. This action is not reversible, as it cannot be undone without adverse impacts. Even assuming that the suspect has not yet reached the road spikes, the act of retrieving the road spikes would have the adverse effect of requiring an officer to enter the roadway to retrieve the spikes.

SOP 220 and 230 depict examples of ordered sets of actions where the first actions are reversible, followed by additional actions that are not reversible. The techniques described herein are not so limited. SOP 240 describes a set of ordered actions that intermix reversible and not reversible actions.

SOP 240 describes actions to be executed when an activate automatic external defibrillator (AED) command is received. The first action executed is to turn the device on. This action can be reversed simply by turning the device off. There is no adverse effect to turning the device off. The next action may be to analyze a heart rhythm. This action is not reversible, because even if the analysis is stopped, the analysis that has already occurred cannot be deleted (e.g. procedures/laws may require collected medical data to be retained). Thus, the action of analyzing a heart rhythm is not reversible because of the adverse effect of generating data that cannot be disposed of.

The next action to be performed is to issue a "stand clear" command if it is determined that the patient should be shocked. This action is reversible, as undoing the action (e.g. people in the vicinity no longer need to stand clear, etc.) can be undone without any adverse impact. The next action is to deliver the shock from the AED. As mentioned above, this action is physically not reversible. There is no way to undo the delivery of an electrical shock. The final action is voice reminder to continue CPR. This action is reversible, because it does not directly cause any physical activity to take place.

Although several examples of SOPs with ordered lists of actions to execute have been presented, it should be understood that these are simply provided for purposes of description. What should be understood is that a SOP for a virtual assistant command includes a list of ordered actions to execute when carrying out the command. Each action of the ordered list is either reversible or not reversible and is defined in the SOP. The decision on if an action is reversible or not is made when the list of ordered actions in the SOP is created. Processing of the voice command by the virtual assistant is described in further detail with respect to FIG. 3.

Figure 3:
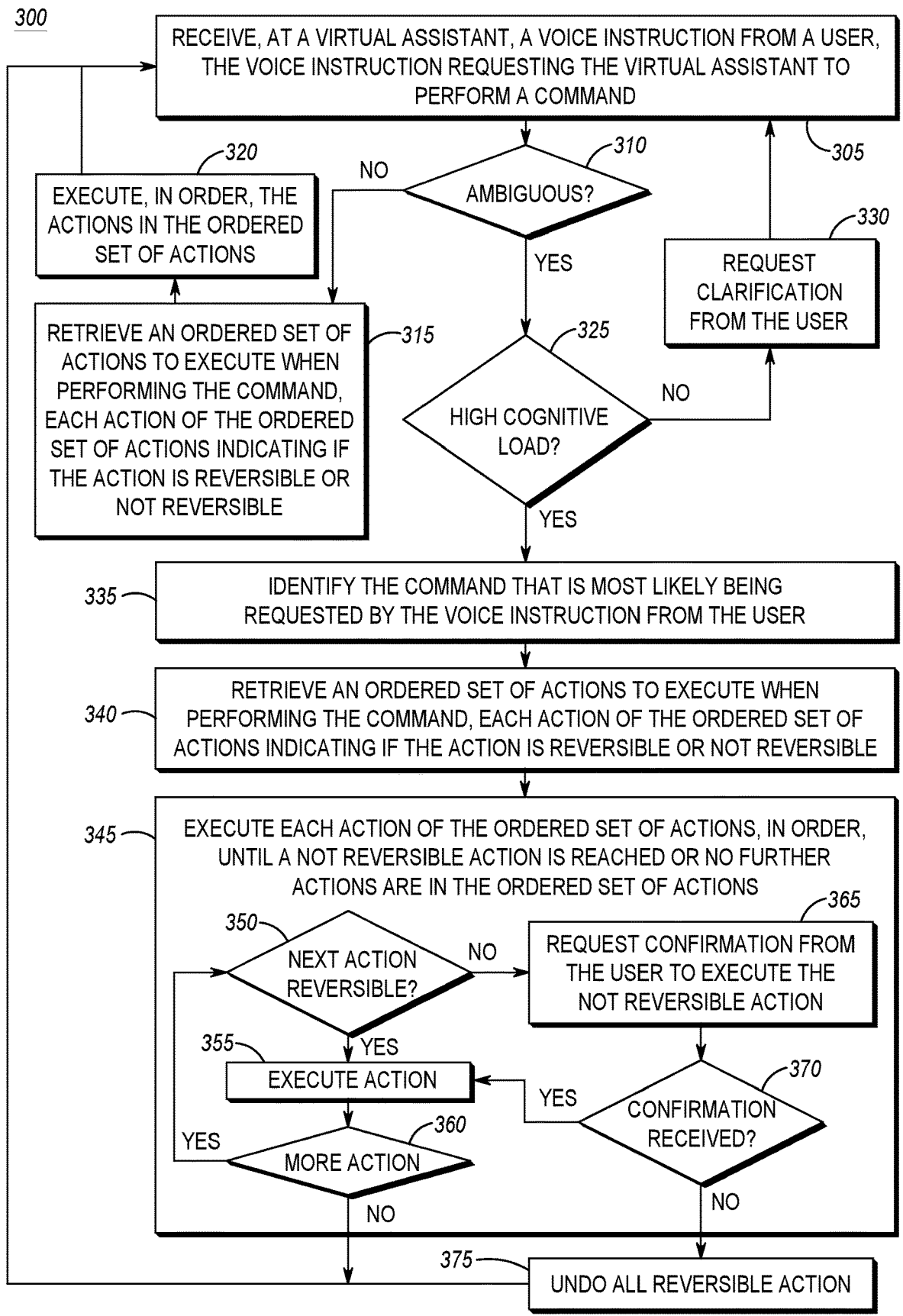
FIG. 3 is an example of a flow diagram that a virtual assistant may use when implementing the techniques described herein.

FIG. 3 is an example of a flow diagram 300 that a virtual assistant may use when implementing the techniques described herein. In block 305, a virtual assistant may receive a voice instruction from a user. The voice instruction may request the virtual assistant to perform a command. In block 310, it may be determined if the command is ambiguous (e.g. the virtual assistant is not able to determine, with a sufficient level of confidence, the command that is being requested). If the command is not ambiguous, the process moves to block 315.

In block 315, an ordered set of actions to execute when performing the command is retrieved. Each action of the ordered set of actions may indicate if the action is reversible or not reversible. In the case where the command is unambiguous, it is not necessary to utilize the reversibility of each action. The process may move to block 320 where each action in the ordered set of actions is executed, in order. The process may then move back to block 305 to wait for the next voice command. In general, the flow described immediately above would be the normal flow of execution of actions.

If, however, it is determined in block 310 that the command was ambiguous, the process moves to block 325. In block 325 it is determined if the user is under high cognitive load. The techniques described herein are not dependent on any particular mechanism for determining if the user is under high cognitive load. For example, the system may utilize biometric information (e.g. pulse rate, blood pressure, breathing rate, etc.) to determine the user is under physical duress (e.g. running after suspect, fighting with suspect, etc.) to determine the user is under a high cognitive load. The system could also look to the type of incident the user is involved in. For example, a critical situation such as an active shooter response would indicate a higher cognitive load than driving a standard patrol route. What should be understood is that the cognitive load of the user is determined.

If the user is under a high cognitive load, it may be counterproductive to ask the user for clarification of the command being requested, as this would further increase the cognitive load of the user. Because the user is not under a high cognitive load, the latency involved in requesting clarification from the user is not significant. If it is determined in block 325 that the user is not under high cognitive load, the process moves to block 330. In block 330, clarification may be requested form the user (e.g. "Please repeat the command", "Did you mean . . . ", etc.). The process may then return to block 305 to receive additional voice instructions, to clarify the command.

If it is determined in block 325 that the user is under high cognitive load, the process may move to block 335. In block 335, the command that is most likely being requested by the user may be identified. As explained above, the techniques described herein are not dependent on any specific mechanism for identifying the most likely command. In some cases, it can be as simple as identifying the command with the highest confidence level, even if that confidence level does not exceed a threshold. The user may be under high cognitive load because he is in a stressful situation. The latency caused by requesting confirmation of the command may be unacceptable. Instead, the virtual assistant may begin executing actions that are reversible right away, thus eliminating any latency. For a command with all reversible actions, the command may execute fully without intervention by the user.

In block 340, an ordered set of actions to execute when performing the command may be retrieved. Each action of the ordered set of actions may indicate if the action is reversible or not reversible. In block 345, each action of the ordered set of actions may be executed, in order, until a not reversible action is reached or no further actions are in the ordered set of actions. In other words, the virtual assistant steps through the actions in order until there are no more actions to execute (command is complete) or an action that is not reversible is reached.

The process of block 345 is described in further detail starting at block 350. In block 350, it may be determined if the next action (which may be the first action) in the ordered set of actions is reversible. If so, the process moves to block 355, where the action is executed. As mentioned previously, there is no harm in executing a reversible action, as it can be reversed with no adverse impact. The process moves to block 360, where it is determined if there are any more actions in the set of ordered actions. If so, the process returns to block 350. If not, the command is complete, and the process moves back to block 305 to await additional commands.

If it is determined in block 350 that the next action is not reversible, the process moves to block 365. In block 365, confirmation is requested from the user to execute the not reversible action. Because the action is not reversible, the increase in cognitive load is justified, as it would not be desirable for an action that is not reversible to be executed when the virtual assistant is not sure that it is executing the proper command, because the command was previously found to be ambiguous.

In block 370, if confirmation from the user is received, the process moves to block 355, where the action is executed. The process then continues as described above. If confirmation from the user is not received in block 370, this means that execution of the command should be terminated. The process may move to block 375, where all reversible actions that have been executed thus far are reversed. The process may then return to block 305 to await the next voice command.

Figure 4:
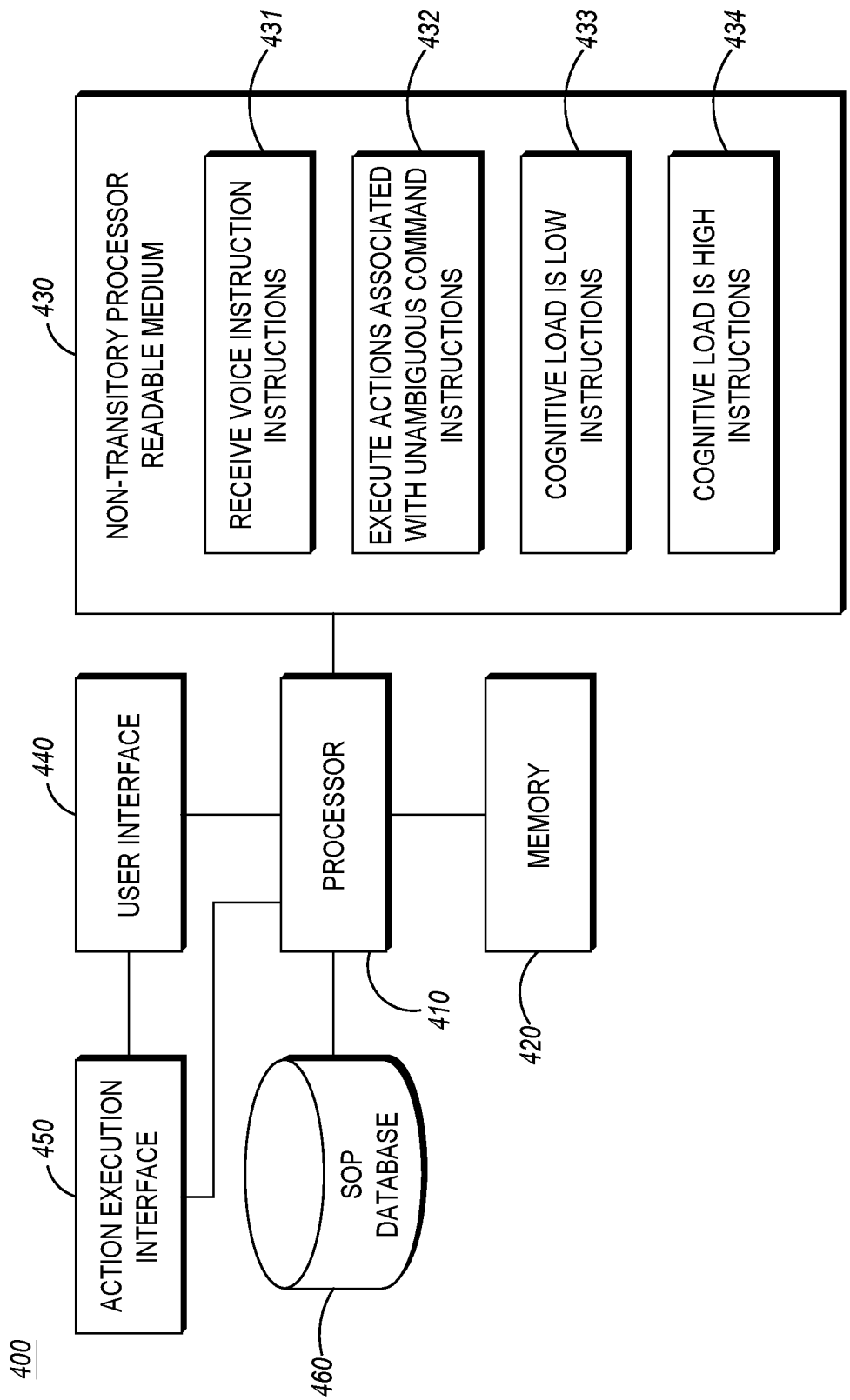
FIG. 4 is an example of a device, such as a virtual assistant, that may implement the virtual assistant execution of ambiguous command techniques described herein.

FIG. 4 is an example of a device, such as a virtual assistant, that may implement the virtual assistant execution of ambiguous command techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. receive voice instructions, high cognitive load instructions, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, user interface 440, action execution interface 450, and SOP database 460.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include receive voice instruction instructions 431. The receive voice instruction instructions 431 may cause the processor to receive a voice command from a user via user interface 440. As explained above, the user may use any number of different devices to access the virtual assistant, including, but not limited to an LMR radio, a cellphone, a laptop computer, etc. The techniques described herein are not dependent on any particular type of user interface. Any user interface that allows the users voice to be received by the virtual assistant that may be implemented on device 400 would be suitable. The receive voice instruction instructions 431 are described throughout this description generally, including places such as the description of block 305.

Medium 430 may also include execute actions associated with unambiguous command instructions 432. The execute actions associated with unambiguous command instructions 432 may cause the processor to identify the command being requested by the user, and retrieve the ordered set of actions to execute in order to carry out the command. For example, the ordered set of actions may be determined by retrieving a SOP corresponding to the command from the SOP database 460. Because the command is no ambiguous, the virtual assistant may execute all of the actions without further user interaction.

The actions may be executed via the action execution interface 450. The techniques described herein are not dependent on any particular type of action execution interface 450, and the interface may vary depending on the type of command. For example, an evacuate building command may utilize an action execution interface 450 that connects to a smart building in order to execute actions (e.g. recall elevators). The action execution interface may be a connection to an internet of things network to execute actions on devices such as AEDs. The action execution interface may be an interface to a computer network, such as the internet, to retrieve data (e.g. maps, etc.) needed for action execution. What should be understood is that the techniques described herein are not dependent on any particular connection between the virtual assistant and the external world. The execute actions associated with unambiguous command instructions 432 are described throughout this description generally, including places such as the description of blocks 310-320.

Medium 430 may also include cognitive load is low instructions 433. The cognitive load is low instructions 433 may cause the processor to determine if the user's cognitive load is currently high. If not, virtual assistant may simply ask the user to clarify the voice instruction. The cognitive load is low instructions 433 are described throughout this description generally, including places such as the description of blocks 325 and 330.

Medium 430 may also include cognitive load is high instructions 434. The cognitive load is high instructions 434 may cause the processor to determine if the user's cognitive load is high, and if so may determine the command the user is most likely trying to perform. The SOP associated with that command may be retrieved from the SOP database 460. The SOP may include an ordered set of actions to execute when carrying out the command. Each action of the ordered set of actions includes an indication if the action is reversible.

The instructions may cause the processor to execute each action, via the action execution interface 450, that is reversible, in order, until either a not reversible action is reached, or no more actions remain (in which case the command is complete). In the case of a not reversible action, the processor may request confirmation from the user via user interface 440, that the user wishes to execute the not reversible action. Upon confirmation the not reversible action is executed. If confirmation is not received, further actions are not executed. In some cases, the lack of confirmation may cause the processor to reverse, via the action execution interface 450, any reversible actions that have already been executed. The cognitive load is high instructions 434 are described throughout this description generally, including places such as the description of blocks 325 and 335-375.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot act as a virtual assistant using natural language processing to identify ambiguous commands, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, at a virtual assistant, a voice instruction from a user, the voice instruction requesting the virtual assistant to perform a command;
   determining whether the command is ambiguous;
   identifying the command that is most likely being requested by the voice instruction from the user;
   retrieving an ordered set of actions associated with the command to execute when performing the command, each action of the ordered set of actions indicating if the action is reversible or not reversible;
   executing each action of the ordered set of actions, in order, until a not reversible action is reached or no further actions are in the ordered set of actions;
   requesting confirmation from the user to execute the not reversible action; and
   reversing all reversible actions that have been executed thus far when confirmation from the user is not received.

2. The method of claim 1 further comprising:
   executing the not reversible action when confirmation is received from the user.

3. The method of claim 2 further comprising;
   repeating the steps of executing each action of the ordered set of actions, requesting confirmation, and executing the not reversible action while unexecuted actions remain in the ordered set of actions.

4. The method of claim 1 further comprising:
   determining the user is under a high cognitive load.

5. The method of claim 1 wherein the action is reversible if it can be undone without adverse effects.

6. The method of claim 1 wherein the action is not reversible if it cannot be undone.

7. The method of claim 1 wherein the action is not reversible if it cannot be undone without adverse effects.

8. A system comprising:
   a processor; and
   a memory coupled to the processor, the memory containing a set of instructions thereon that when executed by a processor cause the processor to:
   receive, at a virtual assistant, a voice instruction from a user, the voice instruction requesting the virtual assistant to perform a command;
   determine whether the command is ambiguous;
   identify the command that is most likely being requested by the voice instruction from the user;
   retrieve an ordered set of actions associated with the command to execute when performing the command, each action of the ordered set of actions indicating if the action is reversible or not reversible;
   execute each action of the ordered set of actions, in order, until a not reversible action is reached or no further actions are in the ordered set of actions;
   request confirmation from the user to execute the not reversible action; and
   reverse all reversible actions that have been executed thus far when confirmation from the user is not received.

9. The system of claim 8 further comprising instructions to:
   execute the not reversible action when confirmation is received from the user.

10. The system of claim 9 further comprising instructions to;
    repeat the steps of execute each action of the ordered set of actions, request confirmation, and execute the not reversible action while unexecuted actions remain in the ordered set of actions.

11. The system of claim 8 further comprising instructions to:
    determine the user is under a high cognitive load.

12. The system of claim 8 wherein the action is reversible if it can be undone without adverse effects.

13. The system of claim 8 wherein the action is not reversible if it cannot be undone.

14. The system of claim 8 wherein the action is not reversible if it cannot be undone without adverse effects.

15. A non-transitory processor readable medium containing a set of instructions thereon that when executed by a processor cause the processor to:
    receive, at a virtual assistant, a voice instruction from a user, the voice instruction requesting the virtual assistant to perform a command;
    determine whether the command is ambiguous;
    identify the command that is most likely being requested by the voice instruction from the user;
    retrieve an ordered set of actions associated with the command to execute when performing the command, each action of the ordered set of actions indicating if the action is reversible or not reversible;
    execute each action of the ordered set of actions, in order, until a not reversible action is reached or no further actions are in the ordered set of actions
    request confirmation from the user to execute the not reversible action; and
    reverse all reversible actions that have been executed thus far when confirmation from the user is not received.

16. The medium of claim 15 further comprising instructions to:
    execute the not reversible action when confirmation is received from the user.

17. The medium of claim 16 further comprising instructions to;
    repeat the steps of execute each action of the ordered set of actions, request confirmation, and execute the not reversible action while unexecuted actions remain in the ordered set of actions.

18. The medium of claim 15 further comprising instructions to:
    determine the user is under a high cognitive load.

19. The medium of claim 15 wherein the action is reversible if it can be undone without adverse effects.

20. The medium of claim 15 wherein the action is not reversible if it cannot be undone without adverse effects.

* * * * *